United States Patent
Rafferty et al.

(10) Patent No.: US 10,840,723 B1
(45) Date of Patent: Nov. 17, 2020

(54) DYNAMIC MANAGEMENT OF MULTIPLE DEVICE POWER CONSUMPTION

(71) Applicant: Capital One Services, LLC, McLean, VA (US)

(72) Inventors: Galen Rafferty, Mahomet, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/713,308

(22) Filed: Dec. 13, 2019

(51) Int. Cl.
  *H02J 7/00* (2006.01)
  *G06F 1/26* (2006.01)

(52) U.S. Cl.
  CPC ............ *H02J 7/00712* (2020.01); *G06F 1/26* (2013.01); *H02J 7/0063* (2013.01)

(58) Field of Classification Search
  CPC ........ G06F 1/26; H02J 7/00712; H02J 7/0063
  See application file for complete search history.

(56) References Cited

U.S. PATENT DOCUMENTS

| | | | |
|---|---|---|---|
| 8,107,243 B2 | 1/2012 | Guccione et al. | |
| 8,810,198 B2 | 8/2014 | Nergaard et al. | |
| 9,562,745 B2 | 2/2017 | Partridge et al. | |
| 2012/0016528 A1* | 1/2012 | Raman | G06F 9/5094 700/291 |
| 2014/0266041 A1* | 9/2014 | Ghosh | B60L 11/1846 320/109 |
| 2015/0251547 A1* | 9/2015 | Nonomura | B60L 11/1816 320/109 |
| 2018/0120915 A1* | 5/2018 | Li | G06F 1/3212 |
| 2019/0250689 A1* | 8/2019 | Ivanov | H02J 7/007 |
| 2019/0389315 A1* | 12/2019 | Zhu | B60L 55/00 |

* cited by examiner

*Primary Examiner* — Richard Isla
*Assistant Examiner* — Johali A Torres Ruiz
(74) *Attorney, Agent, or Firm* — Banner & Witcoff, Ltd.

(57) ABSTRACT

A method, apparatus, and system for dynamic management of multiple device power consumption is disclosed. One or more battery-powered devices may be connected to a power supply for charging. The power supply itself may be another battery-powered device or a dedicated portable charger. The power supply may identify power consumption profiles of the connected devices and determine a power distribution ratio such that the timing of each device's battery depletion may be managed. For example, according to a power distribution profile, a power distribution ratio may be determined such that the projected battery depletion times of all the connected devices substantially coincide with each other. The power supply may distribute power to the connected battery-powered devices according to the determined power distribution ratio and the power distribution ratio may dynamically adapt to changing circumstances such as a device being disconnected, being fully charged, changing its power consumption rate, etc.

20 Claims, 5 Drawing Sheets

DYNAMIC MANAGEMENT OF MULTIPLE DEVICE POWER CONSUMPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to power management and more specifically to power distribution management among multiple battery-powered electronic devices.

BACKGROUND

Members of a modern information society often carry around multiple portable devices such as laptop computers, smartphones, tablets, etc. that all require charging their batteries. Portable chargers, also known as power banks, contain a series of rechargeable batteries and a relatively simple control circuit that prevents the batteries from overheating, etc. However, when more than one battery-powered device is connected for charging, these traditional power banks do not allow its user to have fine control over how the various battery-powered devices are to be charged. In other words, the total amount of electric energy stored inside a power bank is typically distributed equally among the connected devices being charged without taking into account any specific idiosyncrasies associated with these connected devices, which makes it difficult or impossible to easily and efficiently distribute power according to any specific preference that the user might have related to charging these devices.

Aspects described herein may address these and other problems, and generally improve the quality, efficiency, speed, and/or flexibility of charging battery-powered devices from a portable charger.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatuses, systems, and computer-readable media are also within the scope of the disclosure.

According to an aspect of an example embodiment, a power supply, such as a portable charger, may control its power distribution among two or more battery-powered devices that are connected to the power supply for charging. A user may set up a power distribution profile for the power supply and its connected battery-powered devices, and the power supply may determine, based on the power distribution profile and one or more power consumption profiles associated with the connected battery-powered devices, a power distribution ratio for the connected battery-powered devices. The power supply may then distribute power according to the determined power distribution ratio and dynamically adjust this power distribution ratio when necessary, for example, when a change is detected among one of the power consumption profiles of the connected devices. The user may directly interact with the power supply to adjust various settings related to charging, or the user may interact with a separate user device that communicates with the power supply to make various adjustments. Alternatively, the user may interact with one of the connected battery-powered devices that are being charged to make necessary adjustments related to charging the connected devices.

According to another aspect of an example embodiment, one of the battery-powered devices may act as a power supply for other battery-powered devices. For example, a smartphone and a tablet may connect to a laptop having a relatively larger battery capacity for charging (e.g., trickle charging) and the laptop may dynamically allocate charging power among the connected devices (e.g., smartphone and tablet) according to a power distribution profile selected by a user. For example, the user may set up the power distribution profile such that the battery operation times of all three devices (i.e., laptop, smartphone, and tablet) would be synchronized (e.g., the devices would last for the same amount of time).

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for power distribution management among multiple battery-powered electronic devices. Traditional methods of power distribution for a portable charger involve equal power distribution among multiple devices which does not allow for fine control over what portion of power is distributed to each of the connected devices.

Systems as described herein may include dynamic management of power distribution by a power supply such as a portable charger or a battery-powered device. Specifically, a power supply may communicate with its connected devices being charged and adjust power distribution accordingly. The connected devices may, for example, send power consumption profiles, which are related to the respective devices or their batteries, to the power supply, and the power supply in turn may make intelligent decisions to determine an appropriate power distribution ratio among the connected devices. The determination may be further based on a user preference (e.g., a power distribution profile) related to the power distribution. For example, the user may interact directly or indirectly with the power supply to set it up such that power from the power supply would be distributed among the connected battery-powered devices and those devices would run out of battery power at predetermined times (e.g., all at the same time, one at a time at predetermined intervals and in a predetermined order, etc.). Further, the power supply may dynamically (e.g., over time and without human intervention) adjust its power distribution ratio according to changing circumstances such as a device being disconnected, fully charged, etc.

Thus, the apparatuses, systems, and methods according to the disclosed embodiments offer a user a much greater level of control over the distribution of power from a power supply to multiple battery-powered devices that are being charged. The user may adjust the power distribution ratio more easily and in finer detail. Moreover, most steps of the charging operation may be automated, which allows for a "set and forget" experience for the user.

Figure 1:
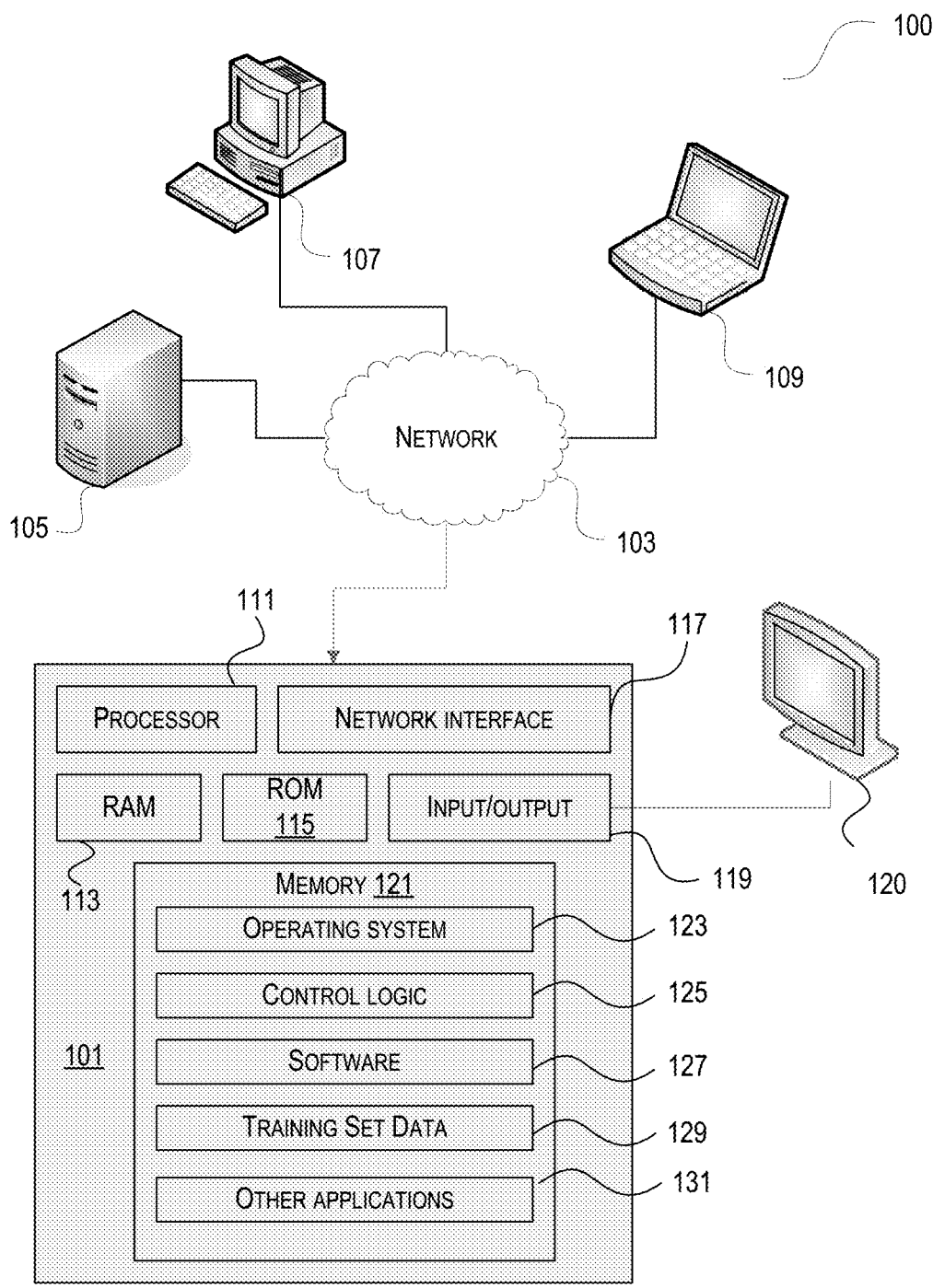
FIG. 1 shows an example of a system in which one or more aspects described herein may be implemented.

FIG. 1 shows system 100. The system 100 may include at least one device 101 connected to other devices 105, 107, 109 either directly or via network 103. It will be appreciated that the network connections shown are illustrative and any means of establishing a communications link between the devices (e.g., electronic devices, computing devices, etc.) may be used. Any of various network protocols such as Transmission Control Protocol/Internet Protocol (TCP/IP), Ethernet, File Transfer Protocol (FTP), Hypertext Transfer Protocol (HTTP), and the like, and/or various wireless communication technologies such as Global System for Mobile Communications (GSM), Code Division Multiple Access (CDMA), Wi-Fi, and Long-Term Evolution (LTE), may be used with network 103, and the various computing devices described herein may be configured to communicate using any of these network protocols or technologies. Network 103 may include a local area network (LAN), a wide area network (WAN), a wireless telecommunications network, and/or any other communication network or combination thereof.

One or more of devices 101, 105, 107, 109 may determine a power distribution ratio for distributing power to one or more battery-powered devices, as described herein. One or more of devices 101, 105, 107, 109 themselves may be battery-powered devices.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure Simple Object Access Protocol (SOAP) messages using Extensible Markup Language (XML) encryption. Specialized hardware may be used to provide secure web services. For example, secure network appliances may include built-in features such as hardware-accelerated SSL and Hypertext Transfer Protocol Secure (HTTPS), Web Services Security (WS-Security), and/or firewalls. Such specialized hardware may be installed and configured in the system 100 in front of one or more computing devices such that any external devices may communicate directly with the specialized hardware.

Computing device 101 may be used with one or more of the computational systems. The computing device 101 may include a processor 111 for controlling overall operation of the computing device 101 and its associated components, including random access memory (RAM) 113, read-only memory (ROM) 115, input/output device 119, network interface 117, and/or memory 121. A data bus may interconnect processor(s) 111, RAM 113, ROM 115, memory 121, I/O device 119, and/or network interface 117. In some embodiments, computing device 101 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 119 may include a microphone, a mouse, a keypad, a touch screen, and/or a stylus through which a user of the computing device 101 may provide input, and may also include one or more speakers for providing audio output and video display device 120 for providing textual, audiovisual, and/or graphical output. Display device 120 may be a display panel, a monitor, etc. In some embodiments, display device 120 may be integrated into computing device 101.

Software may be stored within memory 121 to provide instructions to processor 111 allowing computing device 101 to perform various actions. For example, memory 121 may store software used by the computing device 101, such as operating system 123, control logic 125, software 127 (e.g., machine learning software), data 129 (e.g., training set data for machine learning software), and other applications 131. The memory may also include one or more associated databases. The various hardware memory units in memory 121 may include volatile and nonvolatile, removable and non-removable media implemented in any method or technology for storage of information such as computer-readable instructions, data structures, program modules, or other data.

Memory 121 may include one or more physical persistent memory devices and/or one or more non-persistent memory devices. Memory 121 may include, but is not limited to, RAM 113, ROM 115, electronically erasable programmable read only memory (EEPROM), flash memory or other memory technology (e.g., a solid-state drive (SSD)), optical disk storage, magnetic cassettes, magnetic tape, magnetic disk storage or other magnetic storage devices, or any other medium that may be used to store the desired information and that may be accessed by processor 111.

Network interface 117 may include one or more transceivers, digital signal processors, and/or additional circuitry and software for communicating via any network, wired or wireless, using any protocol as described herein. For example, network interface 117 may include a network adapter, a router, a switch, a gateway, and/or an antenna.

Processor 111 may include a single central processing unit (CPU), which may be a single-core or multi-core processor, or may include multiple CPUs. Processor(s) 111 and associated components may allow computing device 101 to execute a series of computer-readable instructions to perform some or all of the processes described herein. Processor(s) 111 may comprise one or more of a CPU, a graphics processing unit (GPU), a microprocessor, a co-processor, an application processor (AP), a system on chip (SoC), an application-specific integrated circuit (ASIC), etc. Various elements within memory 121 or other components in computing device 101, may include one or more caches, for example, CPU caches used by the processor 111, page caches used by operating system 123, disk caches of a hard drive, and/or database caches used to cache content from a database. For embodiments including a CPU cache, the CPU cache may be used by one or more processors 111 to reduce memory latency and access time. Processor(s) 111 may retrieve data from or write data to the CPU cache rather than reading/writing to memory 121, which may improve the speed of these operations. In some examples, a database cache may be created in which certain data from a database is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 101 are described separately, functionality of the various components may be combined and/or performed by a single component and/or multiple computing devices in communication without departing from the embodiments of the present disclosure.

Figure 2:
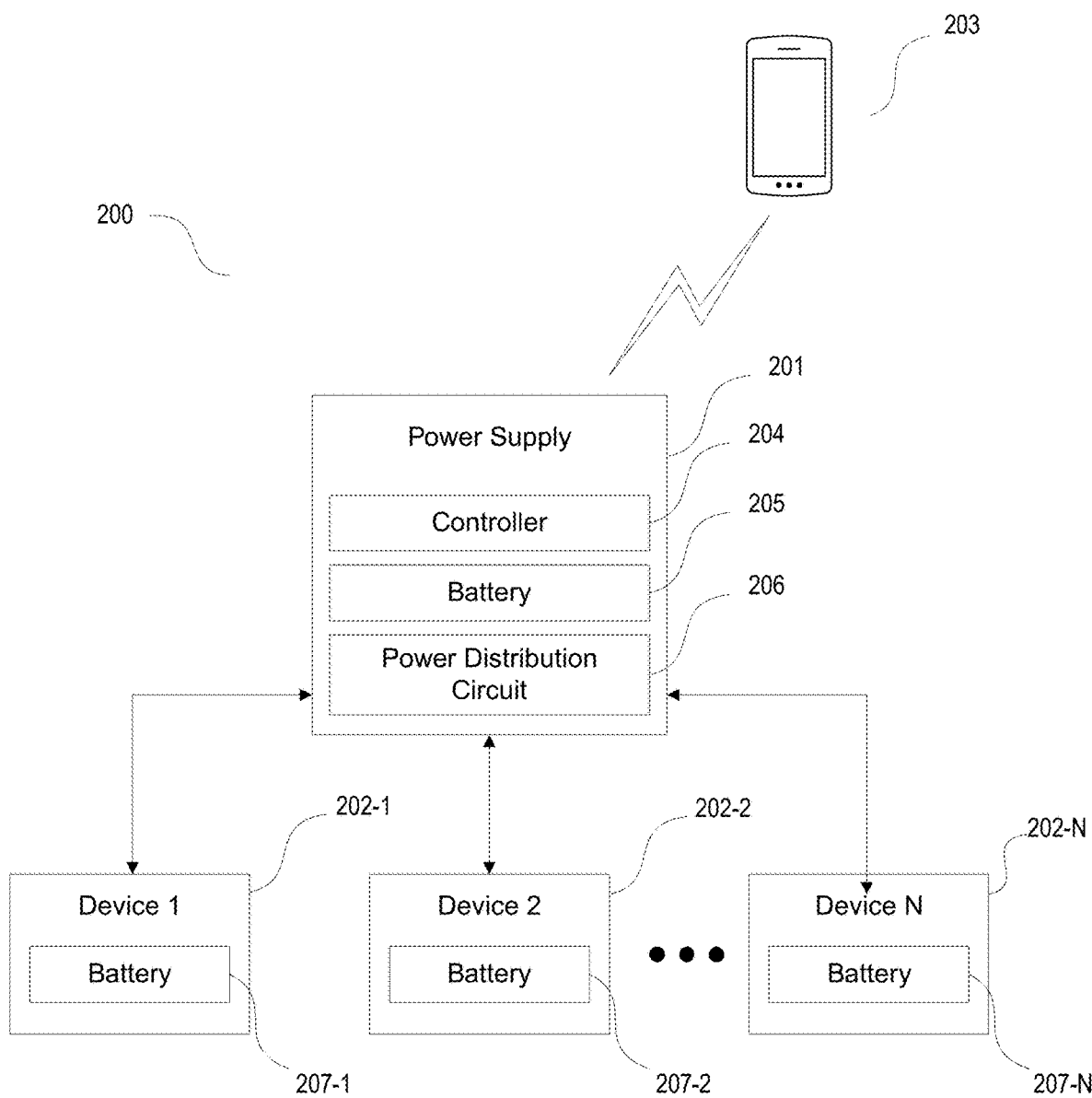
FIG. 2 shows an example power supply and one or more battery-powered devices in accordance with one or more aspects described herein.

FIG. 2 shows an example power supply and one or more battery-powered devices in accordance with one or more aspects described herein. In system 200, power supply 201 may supply power to one or more devices 202-1, 202-2, . . . , 202-N (collectively 202) that are plugged into it. Power supply 201 may be controlled by user device 203. Each of power supply 201, devices 202, and user device 203 may correspond to one or more of devices 101, 105, 107, 109 as shown in FIG. 1.

Power supply 201 may be any electronic device capable of storing electrical power. For example, power supply 201 may be a portable power supply (also referred to as "power bank," "portable charger," "external battery," "external battery pack," etc.), an uninterruptible power supply (UPS), and/or a battery-powered device that may be plugged into a power grid (e.g., via an electric outlet) or another power supply (e.g., a power bank, a UPS, a battery-powered device, etc.) to receive alternating current (AC) or direct current (DC) power and store the received power. When other battery-powered devices such as devices 202 are plugged into power supply 201, power supply 201 may supply AC and/or DC current to one or more devices 202 for charging. Power supply 201 may comprise various components including, but not limited to, controller 204, battery 205, and/or power distribution circuit 206.

Controller 204 may correspond to processor 101 of FIG. 1. Controller 204 may manage overall operations of power supply 201. For example, controller 204 may identify one or more power consumption profiles, determine a power distribution ratio, or control battery 205 and/or power distribution circuit 206 to distribute power to one or more battery-powered devices 202. Battery 205 may be any type of electric battery that comprises one or more electrochemical cells for storing and supplying electric power. For example, battery 205 may comprise one or more of a nickel-metal hydride (NiMH) battery, a nickel-cadmium (NiCd) battery, a lithium-ion battery, a lithium polymer battery, etc. Optionally, in some example embodiments where power supply 201 is connected to the electrical power grid, power supply 201 may lack battery 205. In other example embodiments, power supply 201 may connect to an electrical power grid or another power supply and charge its battery 205.

Power distribution circuit 206 may be connected to battery 205 and distribute its power output to one or more devices 202 connected to power supply 201. In particular, power distribution circuit 206 may be controlled by controller 204 to distribute power to one or more devices 202 according to a power distribution ratio. In other words, charging rates of devices 202 may each be determined by the power distribution ratio of power supply 201. The power distribution ratio may be represented in a ratio of one or more of power (W), energy (W·h), amperage (A), voltage (V), charging time, etc. For example, if there are only two devices 202-1, 202-2 connected to power supply 201, the power distribution ratio may dictate that both devices be charged at 12 watts. In another example, the power distribution ratio may dictate that device 202-1 be charged at 36 watts and device 202-2 be charged at 12 watts, thereby providing three times as much power to device 202-1 than device 202-2. Similarly, the power distribution ratio may indicate how much charging power should be allocated to three or more devices. The devices may be allocated an equal amount of power, all different amounts of power, or some equal and some different amounts of power. One or more devices 202 may receive no power according to the power distribution ratio. The power distribution ratio may also change over time. For example, power supply 201 may start out charging devices 202 at an equal amount of charging rate, but later vary the ratio such that one or more devices charge at a faster rate than the remaining devices. In another example, the charging rate may be higher when the battery level of a device is low, but the charging rate may decrease as the battery level becomes higher and becomes almost fully charged (e.g., over 90% charged). In some example embodiments, a power distribution ratio may indicate for how long each of devices 202 is to be charged. For example, a power distribution ratio may indicate that device 1 (202-1) be charged for 60 minutes, device 2 (202-2) be charged for 74 minutes, and device 3 (202-3) be charged for 48 minutes. Power distribution circuit 206 may comprise various circuit components (e.g., switches, variable resistors, voltage dividers, etc.) that enable adjustment of power output for charging each of devices 202 in accordance with the determined power distribution ratio. The adjustments may be controlled by one or more signals from controller 204.

Each of devices 202 may be any battery-powered electronic device (e.g., a portable device) that requires charging. For example, device 202 may be a laptop computer, a tablet, a smartphone, a smart watch, a mobile hotspot, a portable speaker, etc. Devices 202 may have batteries 207-1, 207-2, . . . , 207-N (collectively "207"). Batteries 207 may be the same or different types of batteries from battery 205. Batteries 207 may be detachable and/or replaceable. Devices 202 may connect to power supply 201 through a power connection and/or data connection. The power connection may be wired or wireless/cordless (e.g., inductive charging, wireless power transfer (WPT), etc.). The data connection may be similarly wired (e.g., Ethernet) or wireless (e.g., Wi-Fi, Bluetooth, near-field communication (NFC), an Infrared Data Association (IrDA) connection, etc.). The power connection may transfer AC and/or DC power. The power connection and the data connection may be separate connections or integrated into a single connection. For example, the integrated connection may be a Universal Serial Bus (USB®) connection, an IEEE 1394 (e.g., FireWire) connection, a Thunderbolt® connection, a power-line communication (PLC) connection, a power over Ethernet (PoE) connection, etc.

Information related to current and/or projected power consumption of each of devices 202 is herein referred to as a power consumption profile. Power consumption profile may also include historical data about the device's power consumption. A power consumption profile may be any information that is relevant to power usage of device 202 or its battery 207. For example, a power consumption profile of device 202-1 may include information about, but not limited to, a maximum battery capacity, a current battery level, a current power consumption rate, a maximum power consumption rate, a minimum (e.g., idle) power consumption rate, power consumption rates over time, etc. Devices 202 may have different or same power consumption profiles. Devices 202 may communicate some or all of this information pertaining to their power consumption profile to power supply 201 and/or user device 203 via a data connection. Alternatively, power consumption profiles may be received from a user (e.g., user manually inputting data) and/or from a server or external database.

User device 203 may be any electronic device or software application that is capable of providing a user interface to its user and communicating with power supply 201. For example, user device 203 may be a personal computer (PC), a server, a laptop computer, a desktop computer, a terminal, a smartphone, a tablet, a smart watch, a wearable computing device, an application, a website, etc. User device 203 may communicate with power supply 201 (e.g., wirelessly and/or over a wired connection) to send commands to power supply 201 and receive responses from power supply 201. User device 203 may communicate directly (e.g., USB, Wi-Fi Direct, NFC, Bluetooth, etc.) with power supply 201 or via a network (e.g., local area network (LAN), wide area network (WAN), Internet, etc.). User device 203 may present a user interface (e.g., a graphical user interface) to a user, and the user may access user device 203 to control power supply 201. Specifically, the user may directly or indirectly adjust the power distribution ratio of power supply 201 among devices 202. For example, the user may instruct power supply 201 to distribute power to devices 202 such that batteries of all devices 202 would be depleted roughly around the same time. The user may otherwise set up power supply 201 such that a high-priority device (e.g., a smartphone having Internet connectivity) lasts longer than a low-priority device (e.g., a tablet). More specifically, the user may instruct power supply 201 to distribute power to devices 202 such that a certain high-priority device lasts at least a certain time amount (e.g., 30 minutes, 1 hours, etc.) longer than a certain low-priority device. Alternatively, the user may instruct power supply 201 to charge a high-priority device faster than a low-priority device, or complete charging any high-priority devices before initiating charging of a low-priority device. Other scenarios and setups are possible including setting an order in which devices 202 deplete their batteries, setting priorities (e.g., which device(s) should last longer) for devices 202, setting devices 202 to run out of power (roughly) at the same time. In some example embodiments, power supply 201 may have present its own user interface (e.g., GUI) to a user and receive user input directly instead of receiving user input via user device 203.

Power supply 201 may be associated with one or more power distribution profiles. A power distribution profile may be associated with target operation time duration(s), a target operation time duration ratio, device priority, and/or a specific power distribution ratio. For example, one power distribution profile may indicate that all devices 207 should last about the same time. Another example power distribution profile may indicate that device 202-1 should last for at least one hour longer than either device 202-2 or device 202-3. Still another example power distribution profile may indicate that device 202-1 and device 202-2 should last for the same amount of time and both should last longer than device 202-3 while device 202-4 receives no power from power supply 201. One or more distribution power distribution profiles may be given a name or a label. For example, distribution power supply 201 may have a "work" power distribution profile, a "home" power distribution profile, a "vacation" power distribution profile, and each power distribution profile may be associated with different target(s) and/or power distribution ratio among devices 207. As an example, a "work" power distribution profile may be optimized for a work environment where a laptop is tethered to a smartphone for Internet connectivity and its power distribution ratio is determined such that the laptop and the smartphone would lose power around the same time. In another example, a "vacation" power distribution profile may prioritize the usage of a cell phone so that the user may be more likely to have access to a cellular phone service when she gets off an airplane at the airport. Various power distribution profiles may be manually created by a user or automatically generated, for example, through machine learning based on user behavior history, power consumption profiles, etc. The power distribution profiles, power consumption profiles of devices 202, etc. may be stored in a database and accessed at a later time. The database may be located inside power supply 201, user device 203, devices 202, and/or any other device such as a server. The user may select previously created power distribution profile(s) to more easily adjust the power distribution ratio.

Power supply 201 may perform calculations to determine, based on the power distribution profile, one or more power consumption profiles of devices 202, and/or information about battery 205, a power distribution ratio for devices 202.

In particular, a current battery level of a device combined with a projected amount of energy to be distributed to that device would yield the total amount of energy that is allotted to that device. When this total amount of energy is divided by the power consumption (e.g., average, minimum, maximum, etc.) of the device, the amount of time the operation of the device may be sustained can be calculated. Thus, a proper distribution ratio may be determined for devices 202 to adjust how long each of devices 202 would last according to the power distribution profile. The power distribution ratio may specify the distribution of power according to availability from power supply 201 such that the ratio specifies which device gets what share of the available power from power supply 201. For example, if device 1 (202-1), device 2 (202-2), and device 3 (202-3), according to their respective power consumption profiles, use 2 watts, 3 watts, and 6 watts of power, respectively, then power supply 201 may determine, according to a power distribution profile that aims to deplete batteries 207-1, 207-2, 207-3 around the same time, a power distribution ratio such that the ratio of stored energies in batteries 207-1, 207-2, 207-3 of devices 202-1, 202-2, 202-3, after charging, may be 2:3:6. Thus, for example, if batteries 207-1, 207-2, 207-3 currently each hold 1 W·h of energy and battery 205 has 8 W·h of energy to distribute, then power supply 201 may allocate 1 W·h, 2 W·h, and 5 W·h to batteries 207-1, 207-2, 207-3, respectively, such that they will have 2 W·h, 3 W·h, and 6 W·h of energy, respectively, after charging. Thus, based on this energy distribution, an appropriate power distribution ratio (e.g., in watts, seconds, etc.) may be also calculated. For example, power supply 201 may distribute 2 W, 3 W, and 6 W to devices 202-1, 202-2, 202-3, respectively, over a same duration of time, or power supply 201 may output a same amount of power to devices 202-1, 202-2, 202-3, for 2 hours, 3 hours, and 6 hours, respectively. Power supply 201 may, of course, take into account other information such as a maximum battery capacity, a current battery level, a current power consumption rate, a maximum power consumption rate, a minimum (e.g., idle) power consumption rate, power consumption rates over time, etc. related to power supply 201 and/or a device being charged, when determining the power distribution ratio. Instead of power supply 201 determining the power distribution ratio, the determination of a power distribution ratio may be performed by other devices such as user device 203, device 202, or any other device.

Controller 204 may monitor (e.g., constantly or periodically) the charging statuses of devices 202 and/or the status of battery 205 as power is being distributed among devices 202 and may dynamically adjust the power distribution ratio if necessary. Devices 202 may communicate (e.g., constantly or periodically) updated information (e.g., power consumption profile) to and from power supply 201. When one or more of devices 202 are prematurely detached from power supply as when the user needs to relocate those devices, controller 204 may readjust the power distribution ratio accordingly, taking into account the missing device(s) and the power consumption profile(s) of the remaining device(s).

Figure 3:
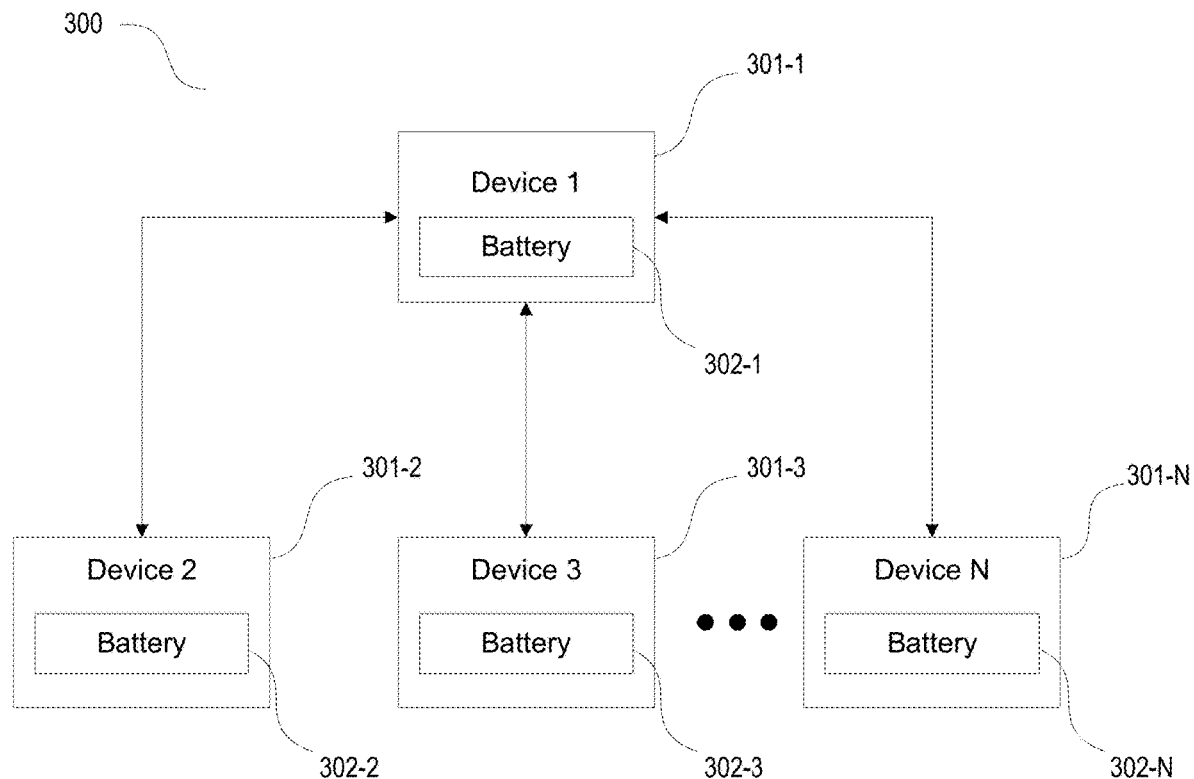
FIG. 3 shows example battery-powered devices in accordance with one or more aspects described herein.

FIG. 3 shows example battery-powered devices in accordance with one or more aspects described herein. System 300 is similar to system 200 illustrated in FIG. 2. However, unlike system 200 in FIG. 2, system 300 does not feature a dedicated power supply such as power supply 201 but one of battery-powered devices 301-1, 301-2, . . . , 301-N (collectively "301"), such as device 301-1, may act as a power supply that supplies charging power to other battery-powered devices 301-2, 301-2, . . . , 301-N. For example, device 301-1 may be a portable device such as a laptop computer and other devices 301-2, 301-3, . . . , 301-N may be other portable devices such as a smartphone, a tablet, etc. that are connected to device 301-1 for charging. Thus, the user may opt to use one of her portable devices having a relatively large battery capacity to act as a portable charger for other portable devices. Although FIG. 3 illustrates at least three devices 301-2, 301-3, . . . , 301-N being connected to device 301-1 for charging, fewer than three devices may be connected to device 301-1 for charging. Device 301-1 may be considered as functioning as power supply 201 of FIG. 2. The user may interact with device 301-1 to create, select, or adjust a power distribution profile for connected devices 301-2, 301-3, . . . 301-N. As with system 200 of FIG. 2, the user may interact with device 301-1 via an intermediary device similar to user device 203 of FIG. 2, or the user may interact directly with device 301-1 to create, select, or adjust the power distribution profile.

Devices 301-2, 301-3, . . . , 301-N may communicate with device 301-1 to send their respective power consumption profiles (indicating one or more of a maximum battery capacity, a current battery level, a current power consumption rate, a maximum power consumption rate, a minimum (e.g., idle) power consumption rate, power consumption rates over time, etc.) to device 301-1. Power consumption profiles may be stored within a memory of one or more of devices 301 and transmitted to and received from each other.

Based on the power distribution profile that has been selected by the user or automatically created, and further based on the power consumption profiles received from devices 301-2, 301-3, . . . , 301-N, device 301-1 may determine a power distribution ratio for distributing battery power stored in battery 302-1 among devices 301-2, 301-3, . . . , 301-N to charge batteries 302-2, 302-3, . . . , 302-N. This process is largely similar to how the power distribution ratio is determined in system 200 of FIG. 2. Device 301-1 may also determine the power distribution ratio further based on its own power consumption profile, and the power distribution ratio may indicate how power is to be distributed among all devices 301 including itself (e.g., device 301-1).

Figure 4:
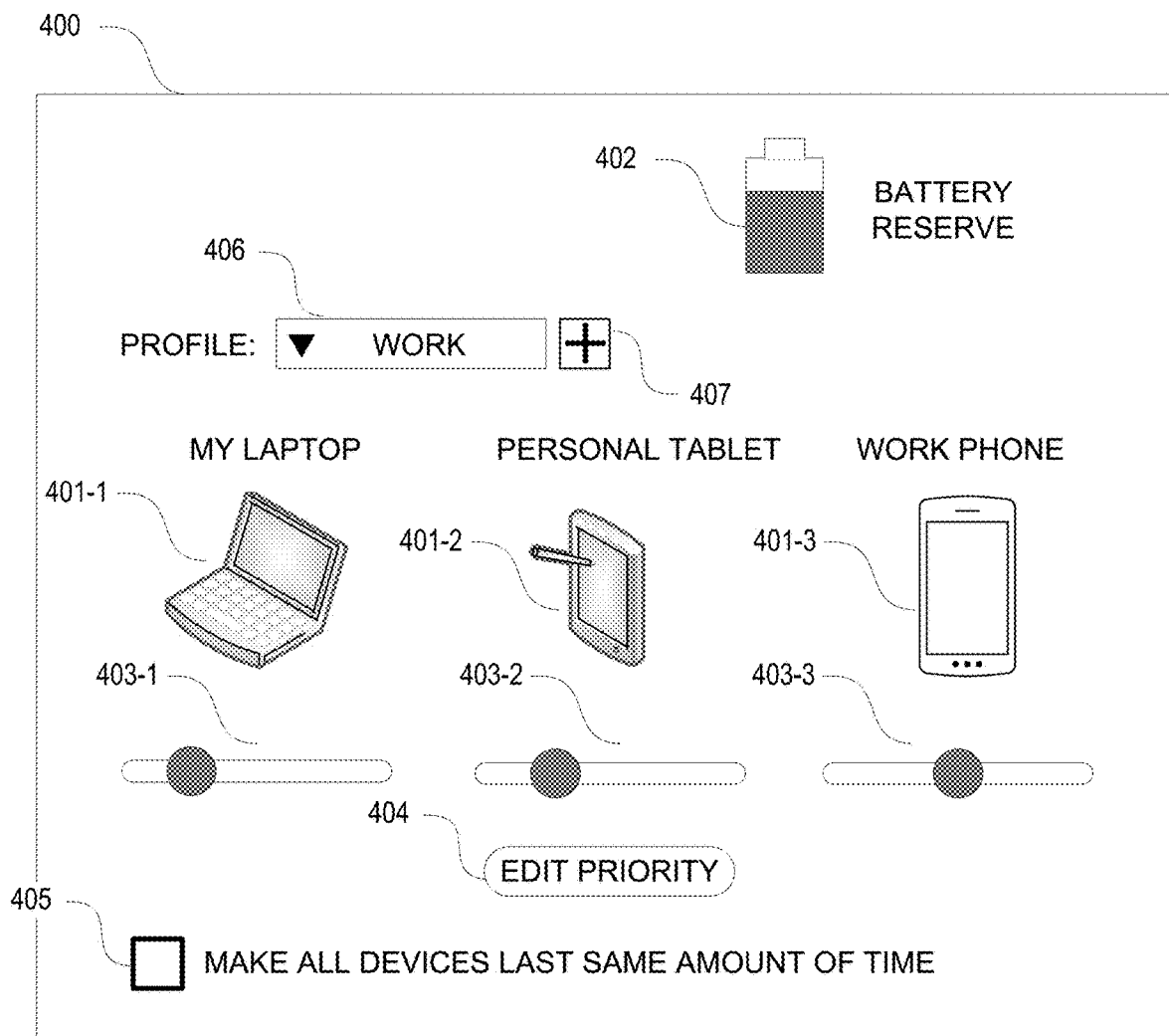
FIG. 4 shows an example user interface in accordance with one or more aspects described here.

FIG. 4 shows an example user interface in accordance with one or more aspects described here. User interface 400 may be presented to a user to allow the user to adjust various aspects regarding charging of devices. User interface 400 may be a GUI. Alternatively, user interface 400 may be wholly or partially non-graphical in nature such as an audio interface. As discussed above, user interface 400 may be presented to the user at a power supply (e.g., power supply 201), a user device (e.g., user device 203), a battery-powered device (e.g., user device 202, user device 301), at a server, on a website, etc. For example, user interface 400 may be part of an Android® app that is running on a user device communicatively connected to a power supply. In another example, user interface 400 may be part of a Windows® application that is running on a battery-powered device that is being charged or supplying power to one or more other battery-powered devices.

User interface 400 may graphically represent one or more battery-powered devices 401-1, 401-2, 401-3 (collectively "401") that are connected for charging. Devices 401 may be connected to a power supply or another battery-powered device for charging. Devices 401 may include, for example, a laptop computer, a tablet, a smartphone, a smart watch, a mobile hotspot, a portable speaker, etc. User interface 400 may include a battery reserve indicator 402 that indicates, by text and/or graphics, how much energy is currently stored in a power supply or a battery-powered device for distribution to other connected devices. Battery indicator 402 may indicate the battery reserve in one or more of percentage (relative to maximum battery charge), joules, watt-hours (W·h), amperage (mA), voltage (V), etc.

User interface 400 may include adjusters 403-1, 403-2, 403-3 (collectively "403") that are associated with respective devices 401. Each of adjusters 403 may be, for example, a slider, a text box, and/or a button that allows a user to interact with it to directly or indirectly adjust a power distribution ratio among devices 401. For example, adjusters 403 may be sliders that allow the user to adjust the power output percentages (e.g., 20%, 30%, and 50%) for respective devices 401. In another example, adjusters 403 may allow the user to set at what time (e.g., 12:30 pm, 12:48 pm, and 1:15 pm) or time intervals (e.g., 20 minutes after, 35 minutes after) batteries of devices 401 would be depleted. When one of adjusters 403 is adjusted by the user, the remaining two adjusters may be automatically adjusted accordingly. For example, if adjuster 403-1, 403-2, 403-3 were previously set at 20%, 30%, and 50% and the user increases adjuster 403-1 to 60%, adjusters 403-2 and 403-3 may be automatically adjusted to 15% and 25%, respectively, to maintain the total sum of 100%.

User interface 401 may include a UI element such as edit priority button 404 to allow a user to edit priorities of devices 401. Alternatively, user interface 401 may allow the user to drag and drop and rearrange placement of icons for devices 401 to set the priority. The priority may be taken into account when a power distribution ratio is determined such that a higher-priority device would last longer than a lower-priority device.

User interface 401 may offer a quick and easy way for a user to set devices 401 to last for the same amount of time. For example, user interface 401 may offer option 405, such as a checkbox, that the user can interact with to synchronize battery depletion times for devices 401. When option 405 is selected, an appropriate power distribution ratio may be calculated based on relevant information (e.g., power distribution profile, power consumption profile(s), battery reserve amount, etc.) such that batteries of devices 401 would run out around the same time. Adjusters 403 may be automatically adjusted according to this determined power distribution ratio after option 405 is selected. Other options or shortcuts may be included in user interface 401 that allow the user to easily set or adjust operation duration targets for devices 401, such as an option to prioritize certain types of devices (e.g., laptop computers) over other types of devices (e.g., smartphones). User interface 401 may allow the user to save various settings (e.g., adjuster 403 positions, priorities 404, options 405) as one or more power distribution profiles. A previously saved power distribution profile (e.g., "work," "home," "vacation," "my settings," etc.) may be selected via a UI element such as menu 406, or a new power distribution profile may be created by selecting a UI element such as button 407.

Figure 5:
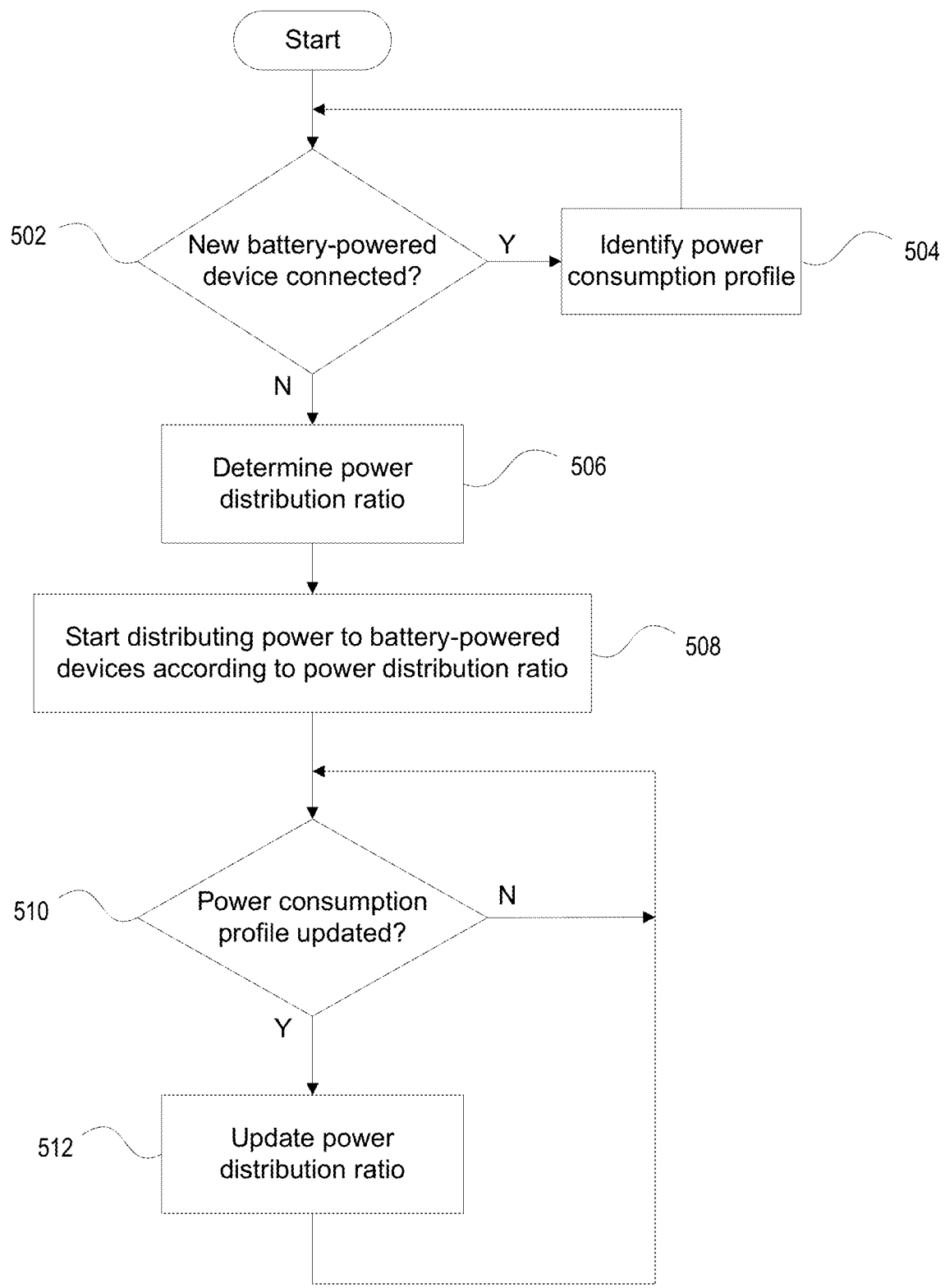
FIG. 5 shows a flow chart of a process for distributing power to battery-powered devices according to one or more aspects of the disclosure.

Having disclosed some basic system components and concepts, FIG. 5 shows a method that may be performed to implement various features described herein. For the sake of clarity, the method is described in terms of power supply 201 as shown in FIG. 2 configured to practice the method. However, another device such as battery-powered device 202 or user device 203 as shown in FIG. 2; battery-powered device 301 as shown in FIG. 3; or any other device described herein may perform any of the steps disclosed herein. The steps outlined herein are examples and may be implemented in any order and in any combination thereof, including combinations that exclude, add, or modify certain steps.

FIG. 5 shows a flow chart of a process for distributing power to battery-powered devices according to one or more aspects of the disclosure. Some or all of the steps of process 500 may be performed using one or more computing devices as described herein. In step 502, power supply 201 may determine whether a battery-powered device is connected to power supply 201 for charging. Power supply 201 may be a charger, a power bank, and/or a UPS. Power supply 201 may comprise a battery power source. As noted above, however, some or all steps of this example method may be performed by any battery-powered device being charged or a separate user device that is neither providing power nor receiving power. If a newly connected battery-powered device is detected (502:YES), then a power consumption profile associated with the connected battery-powered device (e.g., a battery capacity, a state of charge, a power consumption rate, a battery charging rate, a user behavior, etc.) may be identified in step 504. In other words, power supply 201 may identify power consumption profiles for all battery-powered devices that are connected to power supply 201. Identifying the power consumption profile may be accomplished by requesting and/or receiving the power consumption profile from the battery-powered device. Different power consumption profiles may be received from different battery-powered devices. Some or all of the information pertaining to the power consumption profile may be obtained from a third-party source such as a user input, a server, and/or an external database based on the device identifier of the connected battery-powered device. A power consumption profile may include information related to the connected device and/or its battery.

If there are no more newly connected battery-powered devices, whose power consumption profiles need to be obtained (502:NO), then the process may proceed to step 506, where power supply 201 determines a power distribution ratio for the connected devices. The power distribution ratio may be calculated based on various factors including a power distribution profile, one or more power consumption profiles of the connected devices, the battery status of power supply 201, etc. The power distribution profile may be created based on a user input or automatically generated based on machine learning data (e.g., based on historical user behaviors). The power distribution ratio may indicate with how much power and/or for how long each of the connected battery-powered devices is to be charged. For example, the power distribution rate may be determined such that a first projected battery depletion time of a first battery-powered device substantially coincides with (e.g., falls within a threshold time margin from) a second projected battery depletion time of a second battery-powered device. For example, the power distribution ratio may be determined such that the first projected battery depletion time is within a threshold time difference from the second projected battery depletion time. The power distribution ratio may be determined further based on a maximum power output of power supply 201. For example, the maximum power output of power supply 201 may be distributed among the connected battery-powered devices according to the power distribution ratio. The power distribution ratio may indicate a first portion of power supply 201 relative to a second portion of the power of power supply 201, and the first portion may be distributed to the first battery-powered device and the second portion may be distributed to the second battery-powered device. Once the power distribution ratio is determined, in step 508, power supply 201 may start distributing power to the connected battery-powered devices according to the power distribution ratio 508. If the determination of the power distribution ratio is performed by one of the connected battery-powered devices that is being charged by power supply 201, then that battery-powered device may send a command to power supply 201 to distribute power to the connected battery-powered devices according to the power distribution ratio.

Even after the charging initiates, power supply 201 may optionally continue to monitor for any updates in power consumption profiles. In step 510, power supply 201 may determine whether a power consumption profile has been updated. This determination may be performed while power supply 201 is distributing power to battery-powered devices. For example, the connected devices may send (e.g., continuously, periodically, by request, etc.) an updated power consumption profile to power supply 201. Alternatively, if a new battery-powered device was connected, power supply 201 may identify a power consumption profile of the new battery-powered device (e.g., receiving the power consumption profile from the new device). In particular, the updated power consumption profile may include information about an updated current battery level, an updated power consumption rate, etc. If an updated power consumption profile is made available to power supply 201 (510:YES), then power supply 201 may update its power distribution ratio in step 512. If not (510:NO), power supply 201 may continue to monitor for and/or request an updated power consumption profile. The process may end, for example, when some or all of the connected battery-powered devices are fully charged or charging is completed according to the power distribution profile.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although various embodiments have been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Thus, embodiments of the present disclosure should be considered in all respects as illustrative and not restrictive. Accordingly, the scope of the disclosure should be determined not by the embodiments illustrated, but by the appended claims and their equivalents.

What is claimed is:

1. A method comprising:
   identifying, by a power supply, a first power consumption profile of a first battery-powered device and a second power consumption profile of a second battery-powered device;
   determining, based on the first power consumption profile and the second power consumption profile, a power distribution ratio such that a first projected battery depletion time of the first battery-powered device substantially coincides with a second projected battery depletion time of the second battery-powered device; and
   distributing, by the power supply, power to the first battery-powered device and the second battery-powered device according to the power distribution ratio.

2. The method of claim 1, wherein the power supply is at least one of a charger, a power bank, or an uninterruptible power supply (UPS).

3. The method of claim 1, wherein the power supply comprises a battery power source.

4. The method of claim 1, wherein the identifying the first power consumption profile and the second power consumption profile comprises:
   receiving, by the power supply and from the first battery-powered device, the first power consumption profile; and
   receiving, by the power supply and from the second battery-powered device, the second power consumption profile.

5. The method of claim 1, wherein the identifying the first power consumption profile and the second power consumption profile comprises receiving the first power consumption profile and the second power consumption profile as a user input.

6. The method of claim 1, wherein the identifying the first power consumption profile and the second power consumption profile comprises receiving the first power consumption profile and the second power consumption profile from a server.

7. The method of claim 1, wherein each of the first power consumption profile and the second power consumption profile comprises at least one of a battery capacity, a state of charge, a power consumption rate, a battery charging rate, or a user behavior.

8. The method of claim 1, wherein the power distribution ratio is determined such that the first projected battery depletion time is within a threshold time difference from the second projected battery depletion time.

9. The method of claim 1, wherein the power distribution ratio is determined further based on a maximum power output of the power supply.

10. The method of claim 1, wherein the power distribution ratio indicates a first portion of the power of the power supply relative to a second portion of the power of the power supply, and wherein the first portion is distributed to the first battery-powered device and the second portion is distributed to the second battery-powered device.

11. A power supply comprising:
a battery power source;
one or more processors; and
memory storing instructions that, when executed by the one or more processors, cause the power supply to perform:
- identifying a first power consumption profile of a first battery-powered device connected to the power supply;
- identifying a second power consumption profile of a second battery-powered device connected to the power supply;
- determining, based on the first power consumption profile and the second power consumption profile, a power distribution ratio such that a first projected battery depletion time of the first battery-powered device is within a threshold time difference from a second projected battery depletion time of the second battery-powered device; and
- distributing, from the battery power source, power to the first battery-powered device and the second battery-powered device according to the power distribution ratio.

12. The power supply of claim 11, wherein the power supply is at least one of a charger, a power bank, or an uninterruptible power supply (UPS).

13. The power supply of claim 11, wherein the battery power source comprises a rechargeable battery.

14. The power supply of claim 11, wherein, to identify the first power consumption profile and the second power consumption profile, the instructions, when executed by the one or more processors, cause the power supply to further perform:
- receiving, from the first battery-powered device, the first power consumption profile; and
- receiving, from the second battery-powered device, the second power consumption profile.

15. The power supply of claim 11, wherein, to identify the first power consumption profile and the second power consumption profile, the instructions, when executed by the one or more processors, cause the power supply to further perform receiving the first power consumption profile and the second power consumption profile as a user input.

16. The power supply of claim 11, wherein each of the first power consumption profile and the second power consumption profile comprises at least one of a battery capacity, a state of charge, a power consumption rate, a battery charging rate, or a user behavior.

17. The power supply of claim 11, wherein the power distribution ratio is determined such that the first projected battery depletion time substantially coincides with the second projected battery depletion time.

18. The power supply of claim 11, wherein the power distribution ratio is determined further based on a maximum power output of the power supply.

19. The power supply of claim 11, wherein the power distribution ratio indicates a first portion of the power of the power supply relative to a second portion of the power of the power supply, and wherein the first portion is distributed to the first battery-powered device and the second portion is distributed to the second battery-powered device.

20. A system comprising:
a power supply comprising:
  a battery power source;
  one or more processors; and
  memory storing instructions;
a first battery-powered device comprising a first power cable connected to the power supply; and
a second battery-powered device comprising a second power cable connected to the power supply,
wherein the instructions, when executed by the one or more processors, cause the power supply to perform:
- receiving, from the first battery-powered device, a first power consumption profile of the first battery-powered device;
- receiving, from the second battery-powered device, a second power consumption profile of the second battery-powered device;
- determining, based on the first power consumption profile and the second power consumption profile, and further based on a maximum power output of the power supply, a power distribution ratio such that a first projected battery depletion time of the first battery-powered device substantially coincides with a second projected battery depletion time of the second battery-powered device; and
- distributing, from the battery power source, power to the first battery-powered device and the second battery-powered device according to the power distribution ratio, and
wherein each of the first power consumption profile and the second power consumption profile comprises at least one of a battery capacity, a state of charge, a power consumption rate, a battery charging rate, or a user behavior.

* * * * *